April 25, 1950  A. A. ERICSON  2,505,612
BAR FEED FOR LATHES AND THE LIKE
Filed Dec. 20, 1944
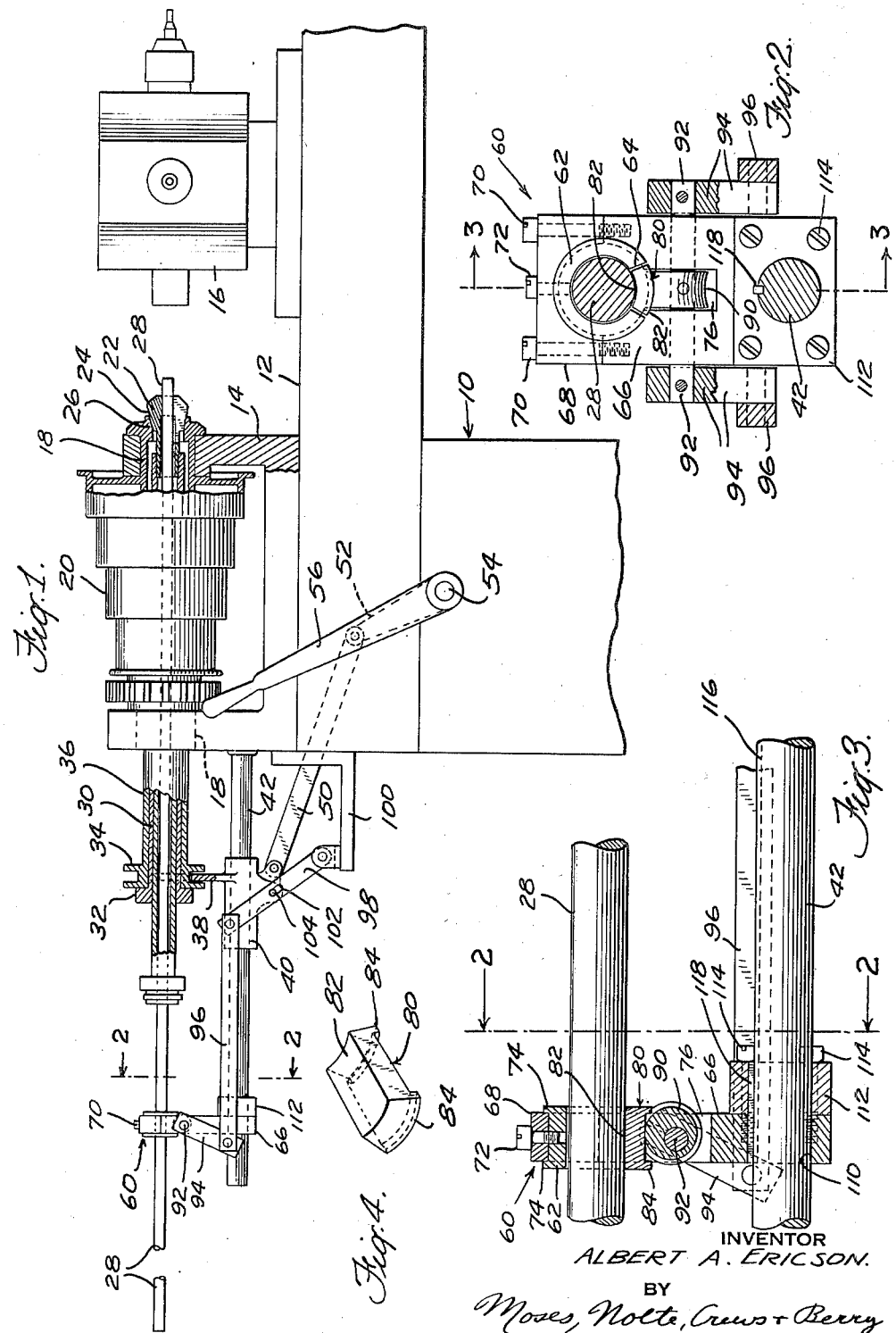
INVENTOR
ALBERT A. ERICSON.
BY
Moses, Nolte, Crews & Berry
ATTORNEYS Patented Apr. 25, 1950

2,505,612

UNITED STATES PATENT OFFICE 2,505,612

BAR FEED FOR LATHES AND THE LIKE

Albert A. Ericson, Massapequa Park, N. Y., assignor to The Farmingdale Corporation, a corporation of New York Application December 20, 1944, Serial No. 568,961

1 Claim. (Cl. 29—61)

This invention relates to devices for feeding bar stock used in machine tools, and is particularly applicable to the feeding of the bar stock commonly used in turret lathes, screw machines, and similar tools in which the bar stock is fed through a hollow head stock spindle to a chuck or collet which grips the forward end of the stock where it is operated on by one or more tools. After the necessary operations have been performed the formed end of the bar is cut off, the chuck is released, and the bar fed forward so as to present another work piece. As machines of this type are utilized for the production of large numbers of parts, it is desirable to provide means for rapidly feeding the stock and opening and closing the chuck or collet to grip the stock in working position. In machines of this kind the bar of stock rotates at high speed with the spindle of the lathe while the work is being performed and it is necessary that the feed device be of such nature that it will not interfere with this rapid rotation of the stock during the turning operations. It is necessary that the feed device be of such nature that the surface of the stock will not be marred during feeding or during rotation of the stock.

In many prior feed devices it has been customary to clamp a collar on the stock by means of a set screw or the like, and to feed by pushing against this collar. Such devices are objectionable as such screw is likely to damage the surface of the stock and furthermore at frequent intervals it is necessary for the operator to stop and loosen the collar and move it along to a new position upon the bar of stock. This delays the operation of the machine.

Among the objects of the present invention are the provision of a bar feed device which will firmly grip and advance the bar without marring the surface; which will permit the bar to rotate freely without injury to its surface during periods when work is being performed on the work piece; which will grip and advance the bar step by step throughout its length without requiring manual adjustments of a collar or the like; and which can be linked up with the means for operating the chuck or collet so that a single hand lever may be utilized to release the chuck, feed the stock, and reclose the chuck.

In the accompanying drawings I have shown one preferred embodiment of the invention as illustrative of the principles thereof but it is to be understood that changes may be made therein without departing from the invention.

In the drawings:

Figure 1 is a side elevation of a part of a turret lathe having the bar feed device of my invention applied thereto, part of the head stock of the lathe being shown in longitudinal vertical section;

Figure 2 is a transverse vertical section taken on the line 2—2 of Figure 1;

Figure 3 is a longitudinal vertical section of the parts shown in Figure 2, taken on the line 3—3 of Figure 2; and Figure 4 is a perspective view of the movable bar gripping member.

Referring to the drawings in detail, 10 is a turret lathe having a bed 12 upon which is mounted a head stock 14 and a turret 16. The head stock carries a spindle 18 mounted in bearings in the head stock and arranged to be driven in any suitable manner as by means of the cone pulley 20. The spindle 18 is provided with any suitable form of gripping chuck or collet, such for instance as the series of spring collet members 22 having tapered outer faces 24 which engage the internal cone 26 at the end of the head stock spindle and are thereby caused to clamp the bar of stock 28. The members 22 are connected to a sleeve 30 which when moved to the left (Fig. 1) causes the members 22 to clamp the bar, and when moved to the right releases the bar. For operating the clutch the sleeve 30 is shown as provided with a collar 32 which is engaged by a grooved collar 34 mounted on a slidable sleeve 36. The grooved collar 34 is engaged by fork 38 carried on sleeve 40 mounted to reciprocate on a guide rod 42. The sleeve 40 is moved on the guide rod by link 50 connected to an arm 52 mounted on a shaft 54 which may be oscillated by means of a hand lever 56. Movement of the hand lever to the left as seen in Figure 1 will cause the chuck to clamp the bar and movement of the lever to the right will release the chuck so as to permit the bar to be advanced. This arrangement is conventional and any suitable equivalent chuck arrangement may be employed.

The bar feed device comprises a feeding clamp 60 adapted to intermittently grip the bar when it is to be fed and to release the bar so as to permit it to rotate freely therein at times while the bar is being rotated and work performed upon it by one or more of the tools carried by the turret 16. In the construction shown, the clamp comprises a bearing sleeve 62 having a smooth inner surface and having a sector cut out preferably at the bottom as indicated at 64 for instance (Fig. 2). The bearing sleeve 62 is mounted in a recess in a pillow block 66 and is held therein by a cap 68 clamped down by screws 70. A screw 72 may be screwed through the cap into the bearing sleeve to prevent it from rotation. The bearing sleeve is preferably provided with flanges 74 fitting on each side of the pillow block and cap. The pillow block is preferably provided with a slot 76 formed therethrough below the cut out sector of the bearing sleeve. A clamping block 80 of the form shown in Fig. 4 is provided to fit loosely in the cut out sector 64, this block having a concave surface 82 conforming to the curvature of the bore of the bearing sleeve 62 and being shown as provided with end flange portions 84. The bearing sleeve 62 and clamping block 80 may conveniently be made by machining a cylindrical sleeve and then sawing out a piece to constitute the clamping block 80. The bearing sleeve and block may be formed of any suitable material of the necessary durability and preferably of some metal forming a good bearing material, such as bearing bronze. A smooth and durable inner surface of these parts is desirable because the formed stock rotates therein at high speed during the machining operations. The clamping block 80 is preferably sufficiently wider than the slot 76 in the pillow block so that the ends of the flanges 84 will overhang the corners of the pillow block at each side of the slot and thereby retain the bearing block 80 in the cut out sector 64. The fit however is sufficiently loose to permit the clamping block to have a slight radial movement. The clamping block rests upon a concavely grooved eccentric cam 90 mounted in the slot 76 and keyed upon a shaft 92 journalled in the pillow block. The shaft 92 may be given a limited movement of rotation by cranks 94 mounted on the ends thereof, the cranks being suitably keyed or pinned to the ends of the shaft 92. Rotation of the shaft 92 by the cranks will turn eccentric 90 so as to move the clamping block 80 into clamping engagement with the bar 32 when the shaft 92 is rotated in a counterclockwise direction, as seen in Fig. 3. Turning of the shaft and eccentric in the opposite direction will obviously release the clamping pressure upon the bar stock. For turning the cranks and eccentric the cranks are connected by means of links 96 to a pair of levers 98 pivoted at their lower ends to a bracket 100 on the bed of the lathe. The levers 98 have slots 102 between their ends, these slots receiving pins 104 mounted on the sleeve 40 which is reciprocated on the guide rod 42 by movement of the hand lever 56 as already described. This lever arrangement multiplies the movement of the feed clamp 60 with respect to the movement of the sleeve 40.

The pillow block 66 has a bearing opening 110 formed in its lower end and is slidably mounted upon the guide bar 42. In order to supplement the bearing of the pillow block on the guide bar, a bearing block 112 is preferably bolted to the pillow block by screws 114. The guide bar 42 is preferably provided with a keyway 116 in which slides a key or feather 118 carried in the pillow block and bearing block 112. This keyway and feather act to hold the pillow block and bearing sleeve 62 in proper alignment with the lathe spindle.

In operation it is to be seen that the operator merely has to manipulate the hand lever 56. Assuming that the bar stock is clamped in the chuck and a piece has been finished by the operations of the tools in the turret, the operator moves the hand lever 56 to the right (Fig. 1). This releases the clamping engagement of the members 22 upon the bar 32. Movement of the hand lever to the right will also pull on the links 96 thus rotating the shaft 92 in a counterclockwise direction, which will similarly rotate the eccentric 90 and thus cause the clamping block 82 to clamp the bar 25 within the bearing sleeve 62. Further movement of the hand lever to the right will accordingly advance the bar 28 to the right. Movement of the hand lever to the left will first release the grip of the feed clamp 60 on the bar, will then move the feed clamp to the left where it is in a position to take a new grip on the bar, and finally will cause the chuck to grip the bar. The feeding movement of the bar stock by means of the feed clamp 60 is produced by the manipulation of the lever 56 prior to the closing of the chuck. It will be seen that if necessary the hand lever 56 may be moved back and forth two or three times before it is moved far enough to the left to close the chuck and each of these movements will operate the eccentric 90 so as to grip the bar which is thereby advanced in two or three short steps. In this way any desired feed of the bar may be secured prior to locking the same in the chuck. In fact by repeated movements of the hand lever 56 long lengths of stock may be fed if such are required for the purposes in hand.

It will be seen that the interior of the sleeve 62 and clamping block surface 82 are smooth and form a practically cylindrical bearing for engagement with the rotating bar stock, so that they will act as a guide for the stock permitting free rotation thereof and holding the stock in proper alignment. Furthermore the surfaces being smooth will not mar the surface of the stock either during feeding or rotation thereof. The block 80 may evidently be readily replaced in case of wear, as also may the sleeve 62. The sleeve 62 and block may also be replaced with similar members of different internal diameter suited to the particular diameter of stock being used.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

What is claimed is:

A bar feed device for lathes and the like having a driven spindle carrying a work clamping chuck, a longitudinal guide, a bar feed member mounted for reciprocable movement thereon, a bar clamp carried by said bar feed member, an operating arm for said clamp and means for reciprocating said bar feed member and actuating said clamp operating arm comprising a link connected to said operating arm, and a lever for reciprocating said link, said lever being fulcrumed to a fixed support at its end opposite to that at which said link is connected, said lever having a slot between its ends, a chuck operating member mounted to reciprocate on said longitudinal guide having a pin working in the slot in the lever, operative connections between said chuck operating member and chuck, a hand lever, and connections between said hand lever and said chuck operating member for reciprocating said member on said guide.

ALBERT A. ERICSON.

REFERENCES CITED

The following references are of record in the file of this patent:

UNITED STATES PATENTS

| Number | Name | Date |
|--------|------|------|
| 434,204 | Rothlisberger | Aug. 12, 1890 |
| 624,491 | Hoffmann | May 9, 1899 |
| 714,895 | Hanson | Dec. 2, 1902 |
| 1,526,050 | Carmichael | Feb. 10, 1925 |
| 2,368,890 | Sherrow | Feb. 6, 1945 |
| 2,388,594 | Bogart | Nov. 6, 1945 |

FOREIGN PATENTS

| Number | Country | Date |
|--------|---------|------|
| 510,312 | Great Britain | July 31, 1939 |